No. 724,246. PATENTED MAR. 31, 1903.
C. BENTLEY.
EGG BEATER.
APPLICATION FILED JAN. 24, 1903.
NO MODEL.
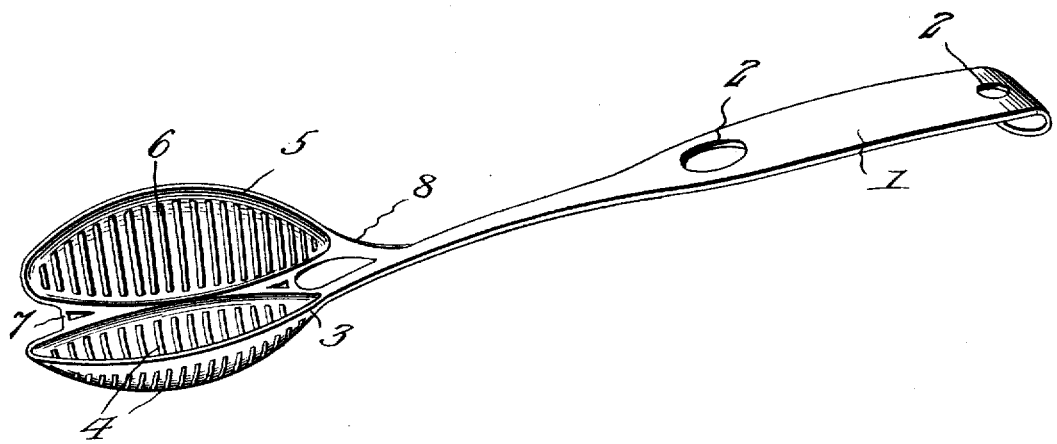
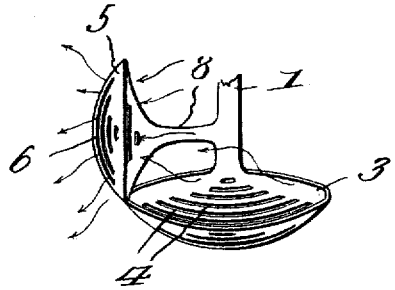
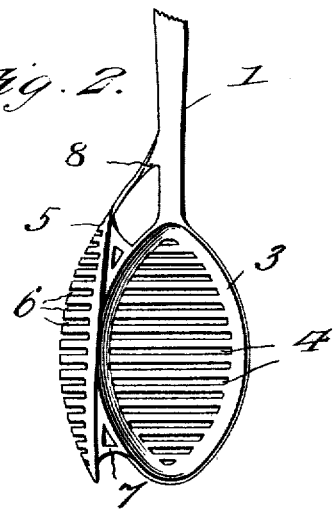
Witnesses
Inventor
Carrie Bentley,
By
Victor J. Evans
Attorneys

UNITED STATES PATENT OFFICE.

CARRIE BENTLEY, OF LINCOLN, ILLINOIS.

EGG-BEATER.

SPECIFICATION forming part of Letters Patent No. 724,246, dated March 31, 1903.

Application filed January 24, 1903. Serial No. 140,410. (No model.)

*To all whom it may concern:*

Be it known that I, CARRIE BENTLEY, a citizen of the United States, residing at Lincoln, in the county of Logan and State of Illinois, have invented new and useful Improvements in Egg-Beaters, of which the following is a specification.

My invention relates to new and useful improvements in egg-beaters; and its object is to provide a device of simple and inexpensive construction whereby eggs may be quickly and thoroughly beaten.

The invention consists in employing a handle at one end of which is provided a spoon-shaped extension having a series of transversely-extending slots therein. Arranged at right angles to this extension is a similar device, which is connected therewith and with the handle before referred to.

The invention also consists in the further novel construction and combination of parts hereinafter more fully described and claimed, and illustrated in the accompanying drawings, showing the preferred form of my invention, and in which—

Figure 1 is a perspective view of the device. Fig. 2 is a plan view of the beating end thereof, and Fig. 3 is a perspective view of said end of the device.

Referring to the figures by numerals of reference, 1 is a handle having apertures 2 therein and provided at one end with a spoon-shaped extension 3, having a series of transversely-extending slots 4 therein. Arranged upon one edge of this extension and at right angles thereto is a similar extension 5, having transversely-extending slots 6 therein and connected with the extension 3, preferably by means of webs 7, and having a shank 8, which is integral with handle 1 and projects from one side thereof.

In operation the handle 1 is grasped in the ordinary manner, and the apertures 2 are adapted to engage the hand and prevent the handle from slipping from position therein. A portion of the egg will pass through the slots in the extension 3; but that portion thereof which would ordinarily pass over said extension is brought into contact with the extension 5 and is compelled to pass through the slots 6 therein. The material is thus soon finely divided, and the labor of beating the egg is reduced to the minimum.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In an egg-beater, the combination of a handle, a slotted extension at one end thereof, and a second slotted extension at one side of, and at an angle to said slotted extension.

2. In an egg-beater, the combination with a handle; of a transversely-slotted extension at one end thereof, and a second transversely-slotted extension at one edge thereof and at an angle thereto.

3. In an egg-beater, the combination with a handle; of a slotted spoon-shaped extension at one end thereof, and a similarly-shaped slotted extension at one side of, and at an angle to said extension.

4. In an egg-beater, the combination with a handle; of a spoon-shaped extension at one end thereof having transversely-extending slots therein, and a similar slotted spoon-shaped extension at one side of, and at an angle to said extension.

5. In an egg-beater, the combination with a handle having an aperture therein; of a spoon-shaped extension at one end thereof having a series of transversely-extending slots therein, a similar slotted spoon-shaped extension at one side of, and at an angle to, said extension, and a shank connecting said similar extension with the handle.

In testimony whereof I affix my signature in presence of two witnesses.

CARRIE BENTLEY.

Witnesses:
JOHN S. HALLER,
EDDIE BENTLEY.